US008775712B2

(12) United States Patent
Suzuki et al.

(10) Patent No.: US 8,775,712 B2
(45) Date of Patent: Jul. 8, 2014

(54) BUS CONNECTING DEVICE FOR CONNECTING HOST WITH EXTERNAL DEVICE

(75) Inventors: Jun Suzuki, Tokyo (JP); Youichi Hidaka, Tokyo (JP); Takashi Yoshikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 112 days.

(21) Appl. No.: 12/098,750

(22) Filed: Apr. 7, 2008

(65) Prior Publication Data

US 2008/0250186 A1      Oct. 9, 2008

(30) Foreign Application Priority Data

Apr. 6, 2007    (JP) ................................. 2007-101026

(51) Int. Cl.
*G06F 13/00*      (2006.01)

(52) U.S. Cl.
USPC .............................. 710/313; 710/302; 710/10

(58) Field of Classification Search
USPC ............ 710/8, 10, 17, 19, 302, 304–306, 313
See application file for complete search history.

(56) References Cited

U.S. PATENT DOCUMENTS

| | | | | |
|---|---|---|---|---|
| 6,241,400 B1* | 6/2001 | Melo et al. | ..................... | 710/313 |
| 7,167,941 B2* | 1/2007 | Iskiyan et al. | ................. | 710/316 |
| 7,356,636 B2* | 4/2008 | Torudbakken et al. | ........ | 710/313 |
| 7,430,662 B2* | 9/2008 | Agan et al. | ........................ | 713/2 |
| 2005/0246460 A1* | 11/2005 | Stufflebeam, Jr. | ............. | 710/104 |
| 2007/0011536 A1* | 1/2007 | Khanna et al. | ................. | 714/733 |
| 2007/0266179 A1* | 11/2007 | Chavan et al. | ................. | 709/250 |
| 2008/0147937 A1* | 6/2008 | Freimuth et al. | .............. | 710/104 |

FOREIGN PATENT DOCUMENTS

| | | |
|---|---|---|
| JP | H8-106429 | 4/1996 |
| JP | 09-185578 | 7/1997 |
| JP | 10-289199 | 10/1998 |
| JP | 2000-066992 | 3/2000 |
| JP | 2001-229117 | 8/2001 |
| JP | 2001-350710 | 12/2001 |
| JP | 2002-510416 | 4/2002 |
| JP | 2003-216565 | 7/2003 |
| JP | 2003-330817 | 11/2003 |
| JP | 2003-330875 | 11/2003 |
| JP | 2005-234872 | 9/2005 |
| JP | 2005-317021 | 11/2005 |
| JP | 2006-209456 | 8/2006 |
| JP | 2007-072907 | 3/2007 |

OTHER PUBLICATIONS

PCI Express Base Specification, Revision 1.0a, Apr. 15, 2003, pp. 299-304, 357-360.*

(Continued)

*Primary Examiner* — Glenn A Auve
(74) *Attorney, Agent, or Firm* — Scully, Scott, Murphy & Presser PC

(57) ABSTRACT

A detecting unit detects a connection of an external device to a connection port and stores the connection in a bridge state storage unit. This setting is autonomously completed by a device before an initial configuration is started by a host. A data transfer unit receives initial configuration data of a link-connection bridge from the host. Data is transferred to the linked-uplink-connection bridge with reference to the bridge state storage unit, data to a bridge which is not linked up is wasted, or an Unsupported Request is returned to the host to represent the absence of the link-connection bridge.

30 Claims, 12 Drawing Sheets

(56) References Cited

OTHER PUBLICATIONS

"Structure Computer Organization" by Andrew S. Tanenbaum, 3$^{rd}$ Edition, pp. 11-13.*

PCI Express Base Specification Revision 1.1, PSI-SIG, on Mar. 28, 2005, pp. 34.
Abstract of WO 99/01820 dated Jan. 14, 1999.
Japanese Official Action dated Jan. 6, 2009 together with English translation.

* cited by examiner

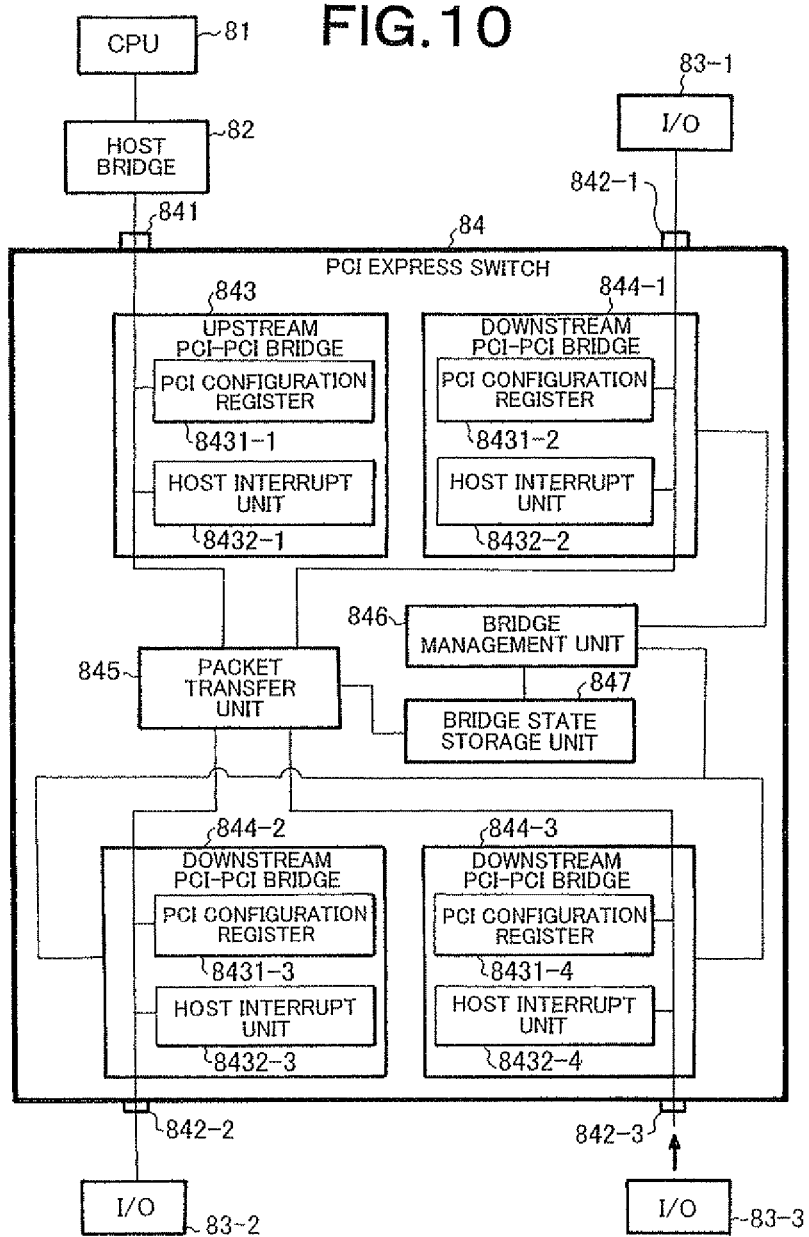

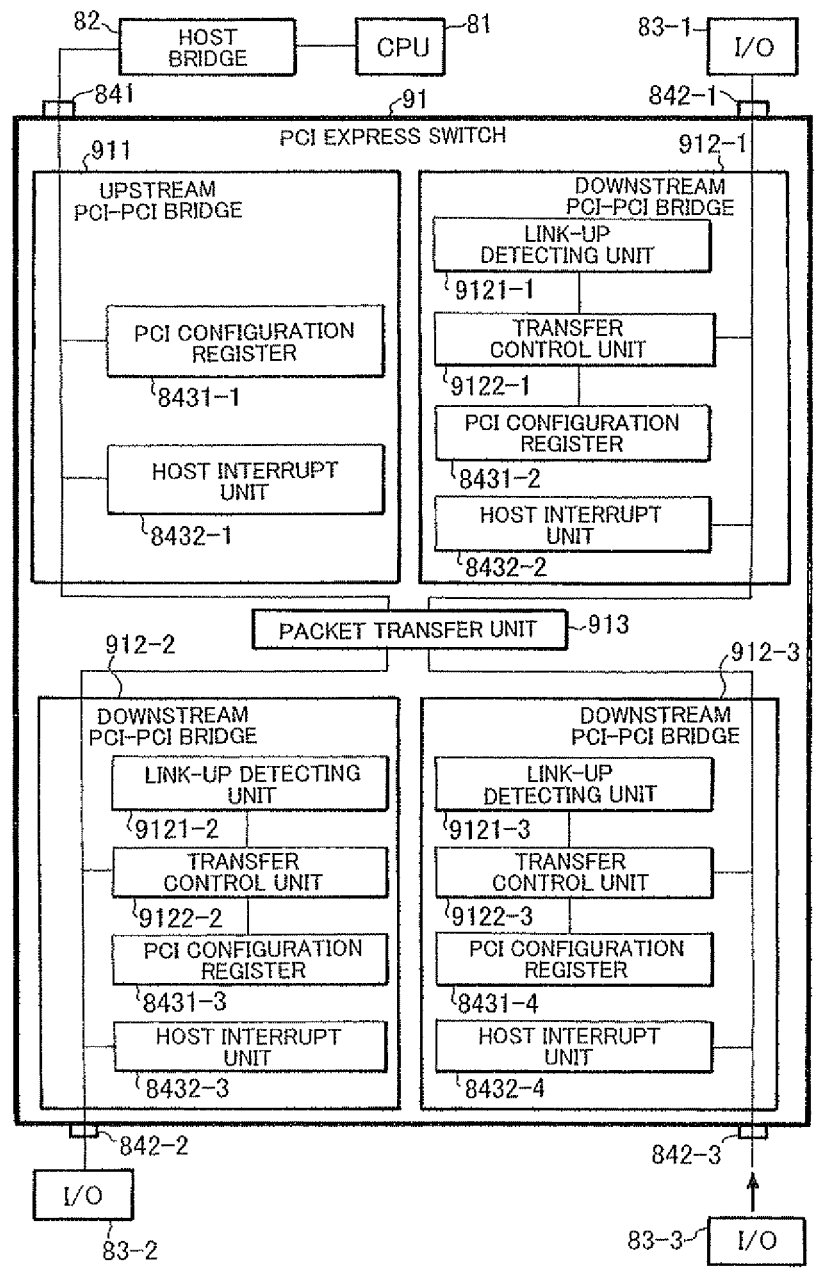

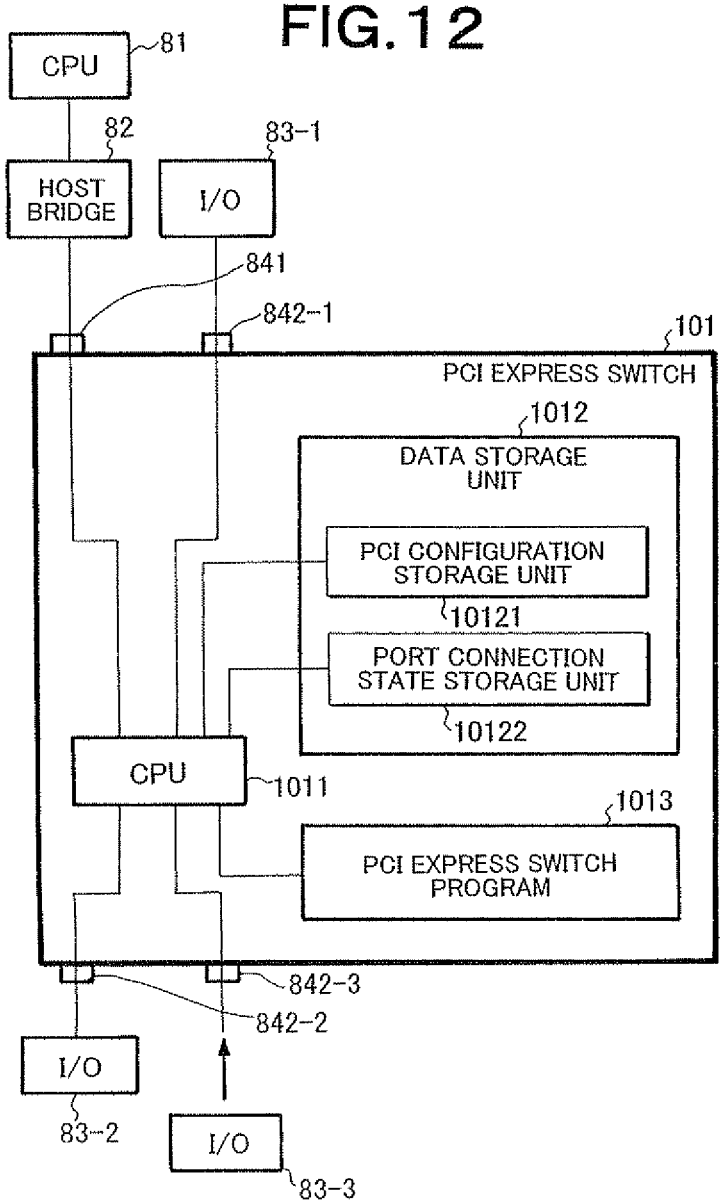

BUS CONNECTING DEVICE FOR CONNECTING HOST WITH EXTERNAL DEVICE

BACKGROUND OF THE INVENTION

1. Field of the Invention

The present invention relates to a bus connecting device, a bus connecting method, and a bus connecting program, and more particularly, to a bus connecting device, a bus connecting method, and a bus connecting program that can shorten an initial configuration time without changing software of a host.

This application is based upon and claims the benefit of priority from Japanese patent application No. 2007-101026, filed on Apr. 6, 2007, the disclosure of which is incorporated herein in its entirety by reference.

2. Description of the Related Art

In the PCI express, a bus connecting device is used as a PCI Express switch which connects a host bridge included in a CPU or a host bridge arranged on a motherboard to a plurality of input and output (I/O) devices.

An example of the PCI Express switch is described in "PCI Express Base Specification Revision 1.1, PSI-SIG, on Mar. 28, 2005, pp. 34". With reference to FIG. 1, a PCI Express switch will be described below.

The PCI Express switch 111 includes an upstream PCI-PCI bridge 1112, downstream PCI-PCI bridges 1114-1 to 1114-3, and an internal bus 1113.

The upstream PCI-PCI bridge 1112 stores a link connected to a host bridge. The downstream PCI-PCI bridges 1114-1 to 1114-3 store a link connected to an I/O device.

The internal bus 1113 connects the upstream PCI-PCI bridge 1112 to each of the downstream PCI-PCI bridges.

In the topology of the PCI Express, a CPU side is called an upstream side, and an I/O side is a downstream side.

In the PCI Express switch 111, an interface corresponding to the upstream PCI-PCI bridge 1112 is an upstream port 1111.

Interfaces corresponding to the downstream PCI-PCI bridges 1111-1 to 1114-3 are downstream ports 1115-1 to 1115-3.

The upstream PCI-PCI bridge 1112 and the downstream PCI-PCI bridges 1114-1 to 1114-3 include PCI Express configuration registers 11121-1 to 11121-4, respectively. The PCI Express configuration registers 11121-1 to 11121-4 hold bridge configuration information and accept device operations from a host.

A TLP (Transaction Layer Packet) serving as a packet for an I/O device received by the upstream PCI-PCI bridge 1112 is transferred to the I/O device through the downstream PCI-PCI bridge connected to a corresponding destination I/O in the downstream PCI-PCI bridge 1114-1 to 1114-3.

On the other hand, TLPs received by the downstream PCI-PCI bridges 1114-1 to 1114-3 and addressed to a host bridge are integrated to the upstream PCI-PCI bridge 1112 and transferred to the host bridge.

As another technique applied to a PCI device, a method that copes with various products by using a common device is proposed in JP-A-2003-330875 (page 6, FIG. 3). The PCI is a bus specification standardized before the PCI express.

FIG. 2 shows a PCI device 122 described in JP-A-2003-330875. The PCI device 122 includes a bus slave 1221 connected to a PCI bus 121 and three functions.

The functions include PCI card bus bridge slots 1222-1 and 1222-2, and an IEEE1394 interface 1223, respectively.

Function number 0 is allocated to the PCI card bus bridge slot 1222-1. Function number 1 is allocated to the PCI card bus bridge slot 1222-2. Function number 2 is allocated to the IEEE1394 interface 1223.

The functions holds PCI configuration registers 12221-1 to 12221-3, respectively.

A host is prohibited from accessing the PCI configuration registers 12221-1 to 12221-3 as needed, the corresponding function can be hidden from the host.

For example, the IEEE1394 interface 1223 corresponding to function 2 is hidden from the host, so that the PCI device 122 can act as if to be a device having functions 0 and 1.

Setting of accesses to the PCI configuration registers 12221-1 to 12221-3 is performed by changing the setting of the PCI configuration registers 12221-1 to 12221-3 of the next function or arranging a physical control pin outside the PCI device 122.

According to the method, even though a common device is used, depending on products, necessary functions are made valid for the products, respectively, and unnecessary functions are hidden to make it possible to customize the device functions and to reduce the number of types of devices.

The PCI Express switch 111 is combined to the technique related to the PCI device 122 described in JP-A-2003-330875 (page 6, FIG. 3) to make it possible to initially configure a downstream PCI-PCI bridge coupled to a I/O device in downstream PCI-PCI bridges 1114-1 to 1114-3 on the basis of the I/O connections of the downstream ports 1115-1 to 1115-3 of the PCI Express switch 111 and to reduce an initial configuration time for the PCI Express switch 111 serving as a host.

More specifically, for a downstream port connected to an I/O device in the downstream ports 1115-1 to 1115-3, the host is permitted to access to the PCI Express configuration resister of the corresponding downstream bridge on the downstream port to show the presence of a bridge.

On the other hand, with respect to a downstream port which is not connected to an I/O device in the downstream ports 1115-1 to 1115-3, the host is prohibited from accessing the PCI Express configuration register on the downstream port to hide the presence of the downstream PCI-PCI bridge on the downstream port.

In a general initial configuration, the BIOS of the host must configure all the downstream ports which are not connected to an I/O device.

However, when the downstream PCI-PCI port to which the I/O is not connected is hidden, relative reduction of the initial configuration time is realized.

SUMMARY OF THE INVENTION

Therefore, it is an exemplary object of the present invention to provide a bus connecting device to shorten an initial configuration time without requiring software to set the bus connecting device or physical hardware such as an external pin.

According to a first exemplary aspect of the present invention, there is provided a bus connecting device connecting a host with an external device, including: a bridge for connecting to the external device; a detecting unit for detecting the bridge linked up by connection of the external device before an initial configuration from the host is started in an initial configuration state of a system including the host and the external device; and a setting unit for setting the bridge which is linked up, as a target for an initial configuration from the host.

According to a second exemplary aspect of the present invention, there is provided a bus connecting device connecting a host with an external device, including: a detecting unit for detecting a bridge linked up by hot-plugging the external device, the external device being hot-plugged to an idle port corresponding to a bridge which is not initially configured by the host during an operation of the host; and a unit for performing interrupt notification to the host with respect to the bridge detected by the detecting unit, the interrupt notification notifying occurrence of a hot plug, wherein the host starts an initial configuration of the hot-plugged bridge in response to the notification.

According to a third exemplary aspect of the present invention, there is provided a bus connecting method for connecting a host with an external device, including: a step of detecting the bridge linked up by connection of the external device before an initial configuration from the host is started in an initial configuration state of a system including the host and the external device; and a step of setting the bridge which is linked up, as a target for an initial configuration from the host.

According to a fourth exemplary aspect of the present invention, there is provided a bus connecting method for connecting a host with an external device, including: a step of detecting a bridge linked up by hot-plugging the external device, the external device being hot-plugged the external device, the external device being hot-plugged to an idle port corresponding to a bridge which is not initially configured by the host during an operation of the host; a step of performing interrupt notification to the host with respect to the bridge detected by the step of detecting, and a step of starting an initial configuration of the hot-plugged bridge in response to the notification in the host.

According to the present invention, a bus connecting device that can autonomously shortens an initial configuration time without changing software of a host can be provided.

BRIEF DESCRIPTION OF THE DRAWINGS

FIG. 10 is a diagram for explaining the first example of the present invention;

FIG. 11 is a diagram for explaining the second example of the present invention; and FIG. 12 is a diagram for explaining the third example of the present invention.

DETAILED DESCRIPTION OF THE PREFERRED EMBODIMENT

Details of exemplary embodiments of the present invention will be described below with reference to the accompanying drawings.

[First Embodiment]

Figure 1:
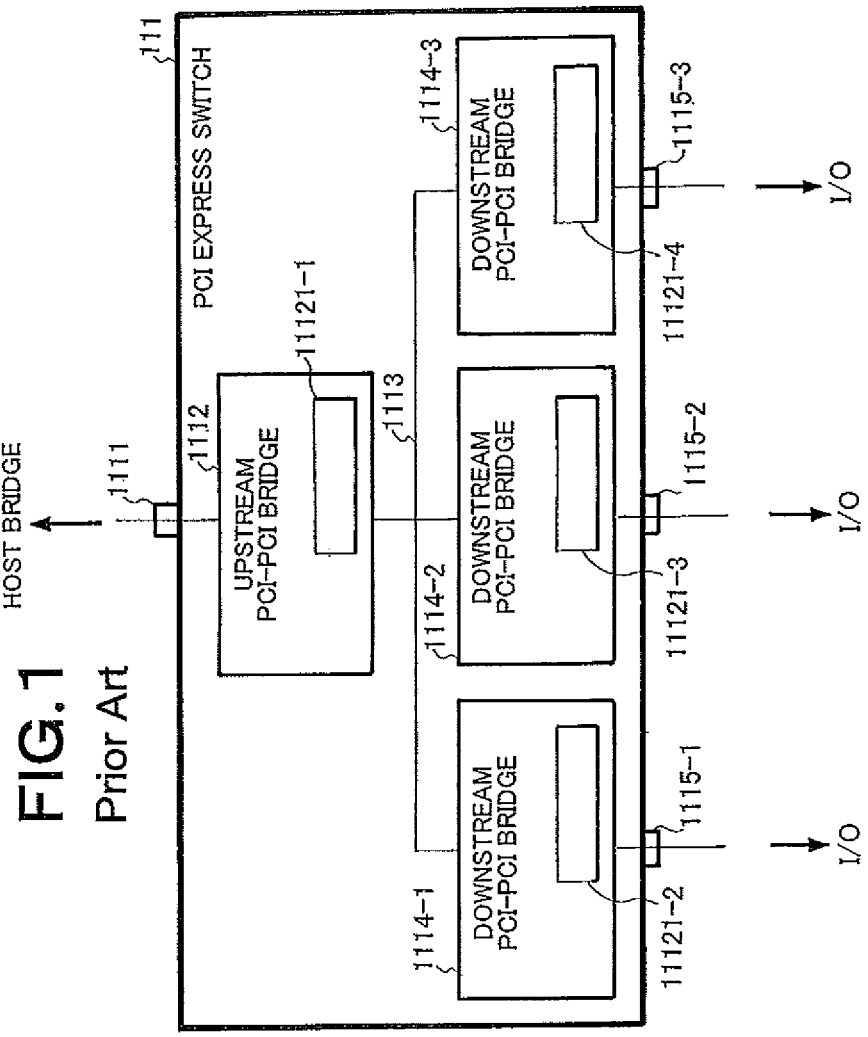
FIG. 1 is a block diagram showing a configuration of a related art.
Figure 2:
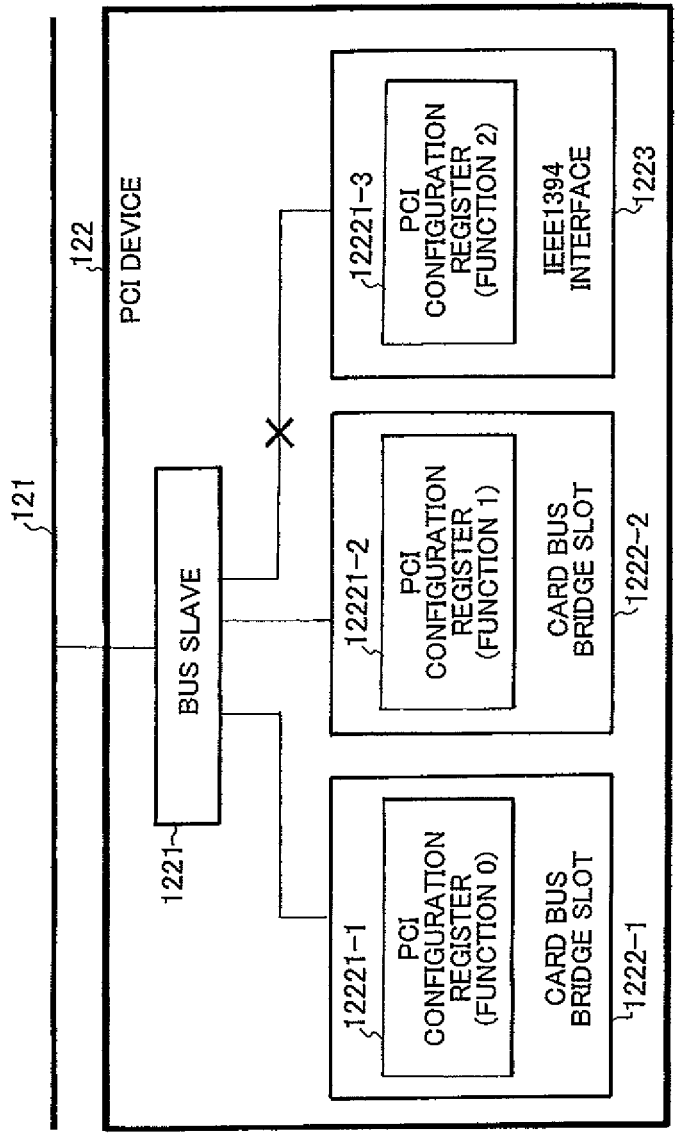
FIG. 2 is a block diagram showing a configuration of a related art.
Figure 3:
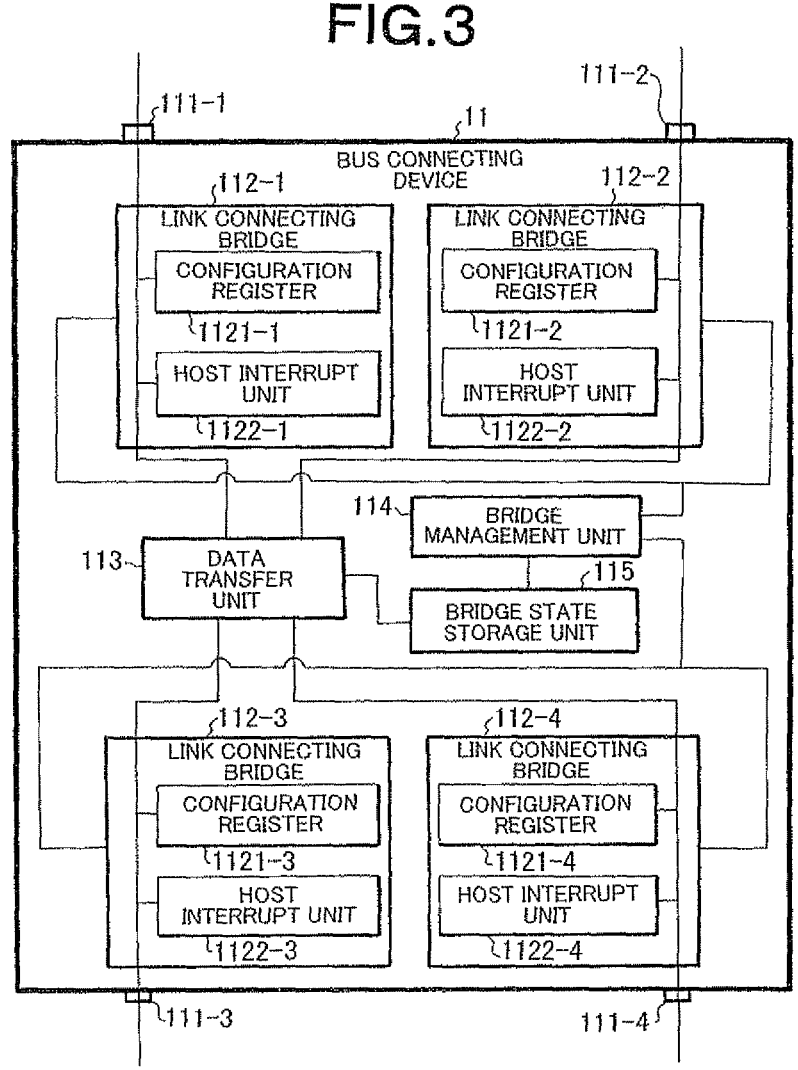
FIG. 3 is a block diagram showing a configuration according to a first embodiment of the present invention.

FIG. 3 is a block diagram showing a configuration of a first embodiment to carry out the present invention.

Referring to FIG. 3, a bus connecting device 11 includes connecting ports 111-1 to 111-4, link connecting bridges 112-1 to 112-4, a data transfer unit 113, a bridge management unit 114, and a bridge state storage unit 115.

The connecting ports 111-1 to 111-4 are units to be connected to an external device. The link connecting bridges 112-1 to 112-4 are units that store links of a bus.

The data transfer unit 113 is a unit that transfers data for an initial configuration obtained by a host between the link connecting bridges 112-1 to 112-4.

The bridge management unit 114 is a unit that detects link-up states obtained by connections between the link connecting bridges 112-1 to 112-4 and the external device to manage connection information. That is, the bridge management unit 114 operates as a detecting unit for detecting the connections.

The bridge state storage unit 115 is a unit that stores the connection information between the link connecting bridges 112-1 to 112-4 and the external device.

The link connecting bridges 112-1 to 112-4 include configuration registers 1121-1 to 1121-4 and host interrupt unit 1122-1 to 1122-4, respectively.

The configuration registers 1121-1 to 1121-4 are units that hold configuration information of bridges and accept a device operation from a host.

Each of the host interrupt units 1122-1 to 1122-4 is unit that notifies a host of interruption when an external device is hot-plugged during an operation of the system.

The bridge management unit 114 detects a connection when the link connecting bridges 112-1 to 112-4 are connected to the external device to write connection information in the bridge state storage unit 115.

The data transfer unit 113 refers to the bridge state storage unit 115 to transfer initial configuration data of the host to the linked-up link connecting bridge connected to the external device in the link connecting bridges 112-1 to 112-4.

An operation of the first embodiment to carry out the present invention will be described in detail with reference to FIGS. 3, 4, and 5.

First, an operation when an initial configuration of an entire system is performed in a power on state or the like will be explained with reference to FIGS. 3 and 4.

When the bus connecting device 11 returns from a device reset state (step 201), the link connecting bridges 112-1 to 112-4 perform training of links (step 202).

According to a result of the training, it is determined whether the link connecting bridges 112-1 to 112-4 are connected to the external device.

When the link connecting bridge which is determined to be connected to the external device is linked up (step 204).

On the other hand, the link connecting bridge which is determined not to be connected to the external device is linked down (step 205).

The bridge management unit 114 detects link-up states of the link connecting bridges 112-1 to 112-4 (step 206).

The bridge management unit 114 writes connection information of the link connecting bridges 112-1 to 112-4 in the bridge state storage unit 115 (step 207).

The steps performed up to now are completed before the initial configuration is started by the host.

Therefore, when the host starts the initial configuration, the data transfer unit 113 refers to the bridge state storage unit 115 to transfer initial configuration data to the link connecting bridge connected to the external device.

Data addressed to the link connecting bridge to which the initial configuration data is not transferred is wasted, or a OR (Unsupported Request) representing the absence of a device is returned to a host.

In the initial configuration obtained by the host, device information is loaded from the configuration register of the link connecting bridge (step 208) connected to the external device.

Control information necessary for the initial configuration of the device is written in the configuration register of the link connecting bridge connected to the external device (step 209) to complete the initial configuration (step 210).

By steps 201 to 210, the bus connecting device 11 is constituted by the link connecting bridges 112-1 to 112-4 connected to the external device. As the bus connecting device 11, an initial configuration is performed by the host (step 301).

An operation when the external device is hot-plugged to the idle connecting ports 1111 to 111-4 during the operation of the host will be described below with reference to FIGS. 3 to 5.

First, the external device is hot-plugged during the operation of the host.

The link connecting bridges 112-1 to 112-4 perform link training of the link to which the device is hot-plugged (step 202).

The link connecting bridges to which the device is hot-plugged are linked up (step 203).

Figure 4:
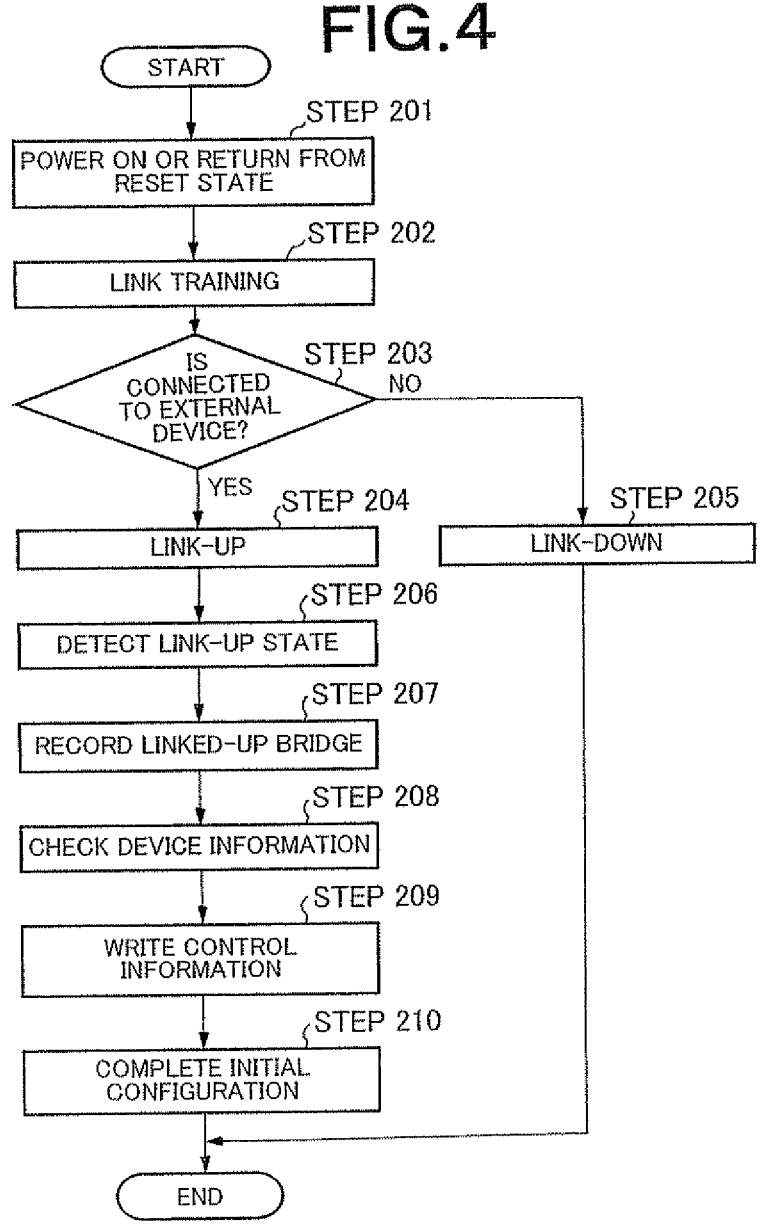
FIG. 4 is a flow chart showing an operation according to the first embodiment of the present invention.
Figure 5:
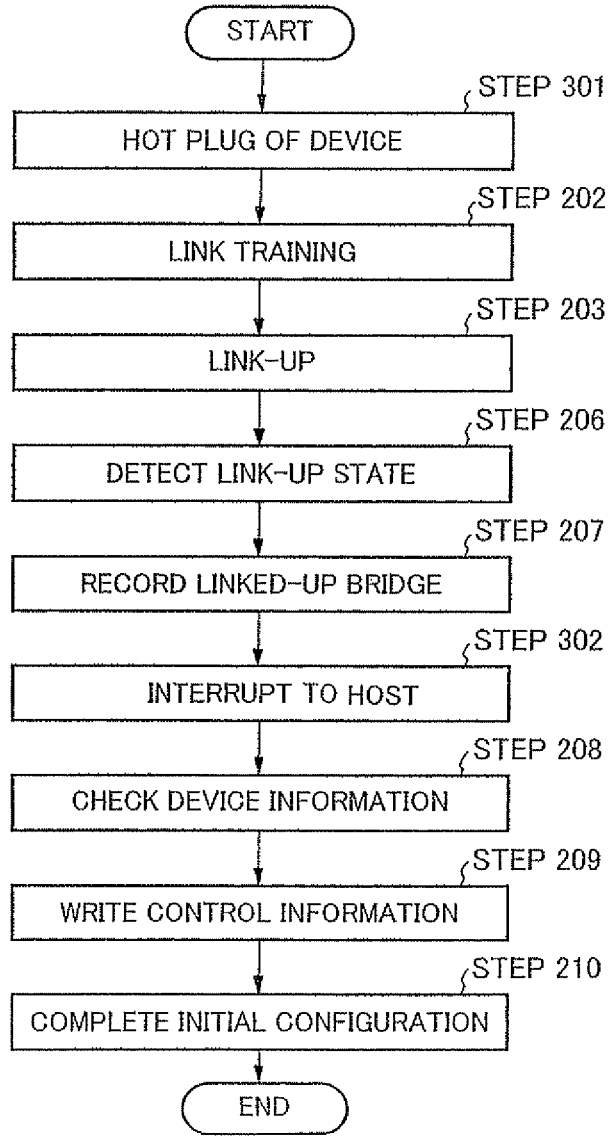
FIG. 5 is a flow chart showing an operation according to the first embodiment of the present invention.

Operations in steps 206 and 207 are the same as the operation performed when the initial configuration of the entire system shown in FIG. 4 is performed.

Subsequently, in the linked-up link connecting bridges, the host interrupt unit sets an interrupt that notifies the host that the device is hot-plugged (step 302).

On the occasion of this interrupt, initial configurations of the linked-up link connecting bridge and the hot-plugged external device are started.

Procedures of the initial configurations of the link connecting bridges 112-1 to 112-4 are the same as those in step 208, step 209, and step 210 shown in FIG. 4.

An effect of the first embodiment to carry out the present invention will be described below.

In the first embodiment, the device detects a bridge to which the external device is connected before an initial configuration is started by the host, and the device is autonomously set such that initial configuration data of the host is transferred to only a bridge the connection of which is detected.

In this manner, only the bridge to which the external device is connected is initially configured by the host, and, in the initial configuration time of the entire bus connecting device, an initial configuration time necessary for a bridge to which the device is not connected is reduced.

This can be realized without changing the software of the host.

A bridge to which the external device is hot-plugged during an operation of the host is detected by the bus connecting device, and an interrupt that notifies a host that the device is hot-plugged is set.

Furthermore, the initial configuration data is permitted to be transferred to the hot-plugged bridge.

The device autonomously performs the above processes. In this manner, even a bridge initially not configured as an unused bridge at the start can validate a function of a bridge which connects the external device during an operation of the host when the external device is hot-plugged.

In the first embodiment, the bus connecting device 11 has four links. However, the number of links is not limited to a specific number.

In the above explanation, the data transfer unit 113 transfers the initial configuration data of the host to only the link connecting bridges 112-1 to 112-4 to which the external device is connected. However, in addition to the link connecting bridge to which the external device is connected, the initial configuration data can also be transferred to a predetermined number of link connecting bridges to which the external devices are not connected.

In order to hot-plug the external device to the system, software of some host copes with the case in which idle link connecting bridges are must be recognized in advance.

[Second Embodiment]

A second embodiment to carry out the present invention will be described below in detail with reference to the accompanying drawings.

Figure 6:
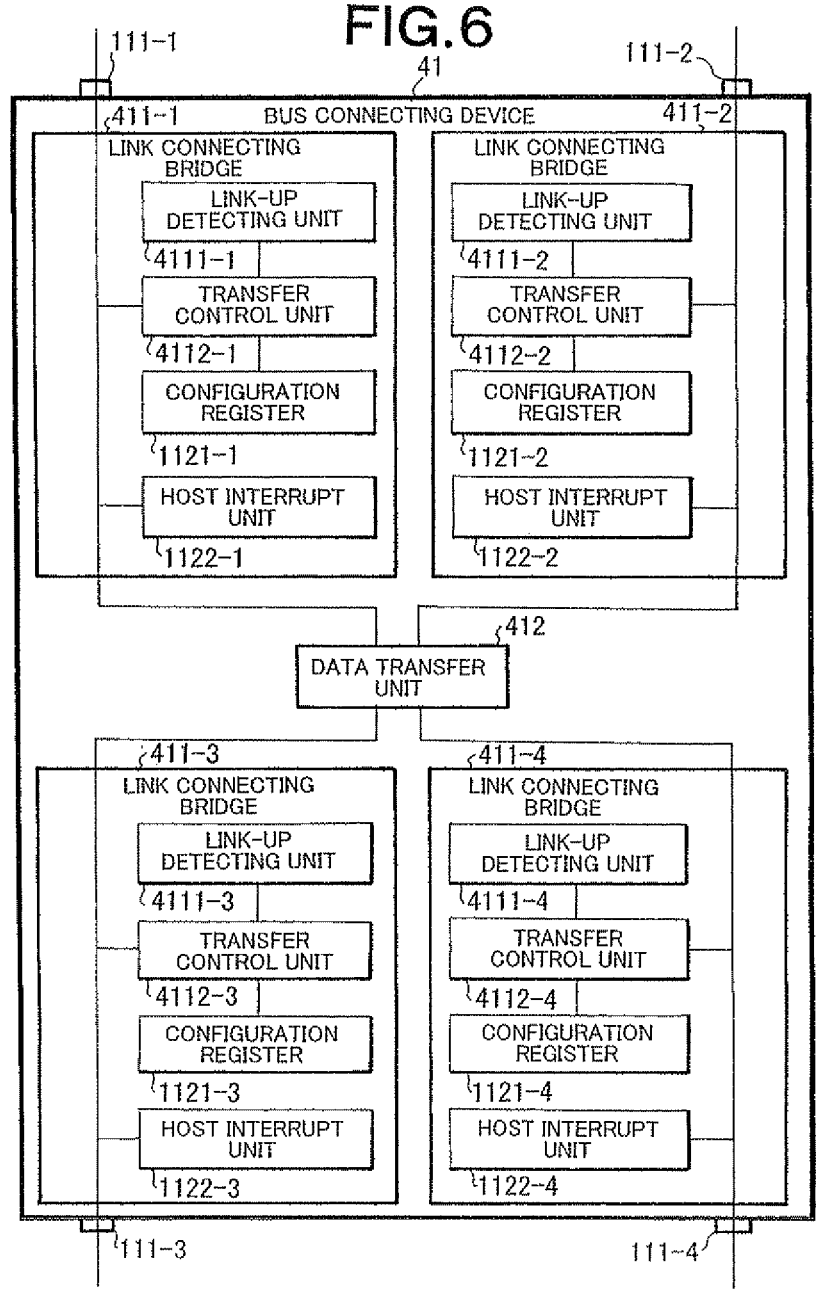
FIG. 6 is a block diagram showing a configuration according to a second embodiment of the present invention.

FIG. 6 is a block diagram showing a configuration of the second embodiment of the present invention.

Referring to FIG. 6, a bus connecting device 41 as the second embodiment of the present invention includes, in place of the bridge management unit of the first embodiment shown in FIG. 3, link connecting bridges 411-1 to 411-4 include link-up detecting units 4111-1 to 4111-4 and transfer control units 4112-1 to 4112-4 that control transfer of initial configuration data from a host to the configuration registers 1121-1 to 1121-4.

The bus connecting device 41 includes a data transfer unit 412 in place of the data transfer unit 113 and does not include the bridge management unit 114 and the bridge state storage unit 115.

The link-up detecting units 4111-1 to 4111-4 detect link-up states of the link connecting bridges 411-1 to 411-4 when an external device is connected to the connecting ports 111-1 to 111-4, and notifies the transfer control units 4112-1 to 4112-4 of the link-up states.

The transfer control units 4112-1 to 4112-4 permit the host to access the configuration registers 1121-1 to 1121-4 when the link connecting bridges 411-1 to 411-4 is linked up. When the link connecting bridges 411-1 to 411-4 are not linked up, the transfer control units 4112-1 to 4112-4 reject access to the configuration registers 1121-1 to 1121-4 or returns a UR (Unsupported Request) representing the absence of the device.

The data transfer unit 412 transfers the initial configuration data of the host received from the link connecting bridges 411-1 to 411-4 to a destination.

An operation of the second embodiment to carry out the present invention will be described below in detail with reference to FIGS. 6 to 8.

First, an operation performed when an initial configuration of an entire system is performed in a power-on state or the like of the system will be described below with reference to FIGS. 6 and 7. Since steps 201 to 205 are the same as those in the first embodiment, a description thereof will be omitted.

The link-up detecting units 4111-1 to 4111-4 autonomously detect link-up states of the corresponding link connecting bridges 411-1 to 411-4 and notify the transfer control units 4112-1 to 4112-4 of the link-up states (step 501).

When the link connecting bridges 411-1 to 411-4 are linked up, the transfer control units 4112-1 to 4112-4 permit the host to transfer data to the configuration registers 1121-1 to 1121-4 (step 502).

As in the first embodiment, the operations up to step 502 are completed before an initial configuration is started by the host. Since steps 208 to 210 are the same as those in the first embodiment, an explanation thereof will be omitted.

Figure 8:
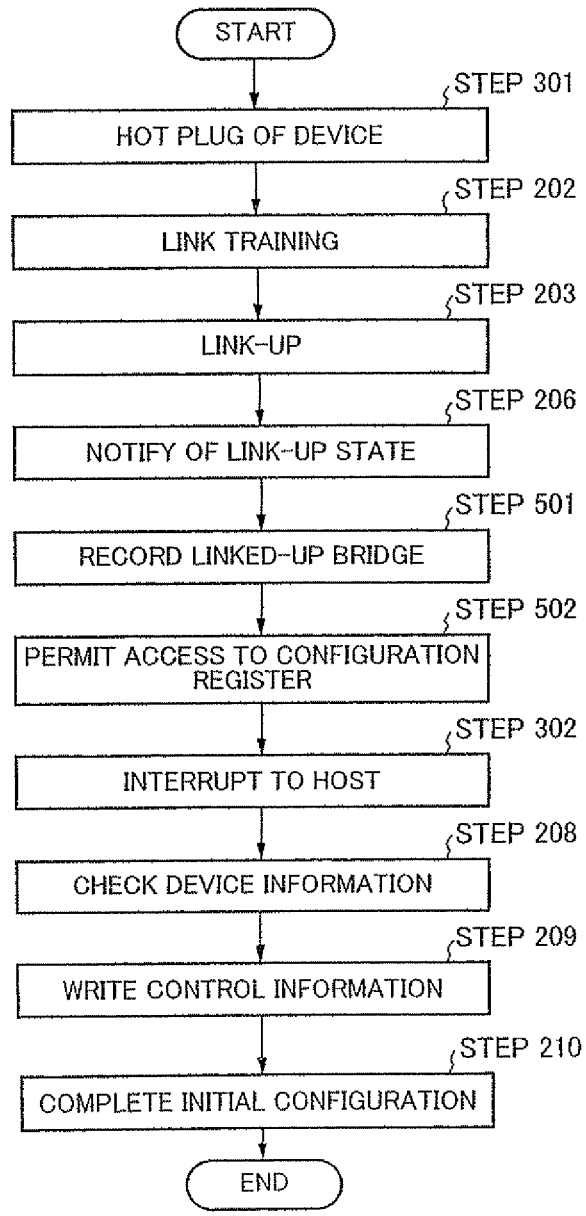
FIG. 8 is a flow chart showing an operation according to the second embodiment of the present invention.

An operation performed when the external device is hot-plugged to the idle connecting ports 111-1 to 111-4 during an operation of the host is shown in FIG. 8.

Figure 7:
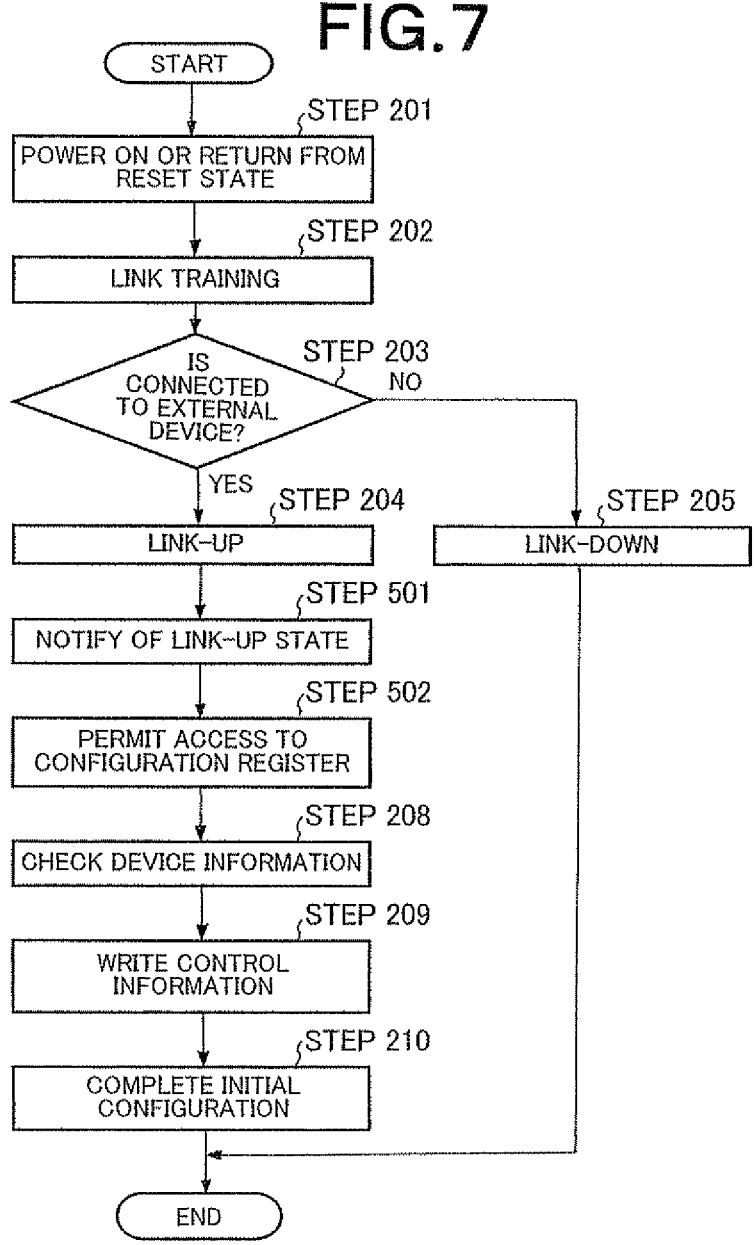
FIG. 7 is a flow chart showing an operation according to the second embodiment of the present invention.

Steps 202 and 203, step 206, steps 208 to 210, steps 301 and 302 are the same as those in the first embodiment, and steps 501 and 502 are the same as the operation performed when an initial configuration of the entire system shown in FIG. 7 is performed. For this reason, a description of these steps will be omitted.

Even in this embodiment, as in the first embodiment, the bus connecting device 41 has four links. However, the number of links is not limited to a specific number.

In the embodiment, the transfer control units 4112-1 to 4112-4 permit only the link connecting bridges 411-1 to 411-4 connected to the external device to be initially configured by the host. However, in addition to the link connecting bridges 411-1 to 411-4 to which the external device is connected, a predetermined number of link connecting bridges 411-1 to 411-4 to which the external device is not connected can be permitted to be initially configured.

In order to hot-plug the external device to the system, software of some host copes with the case in which idle link connecting bridges 411-1 to 411-4 are must be recognized in advance.

[Third Embodiment]

A third embodiment to carry out the present invention will be described below in detail with reference to the accompanying drawings.

Figure 9:
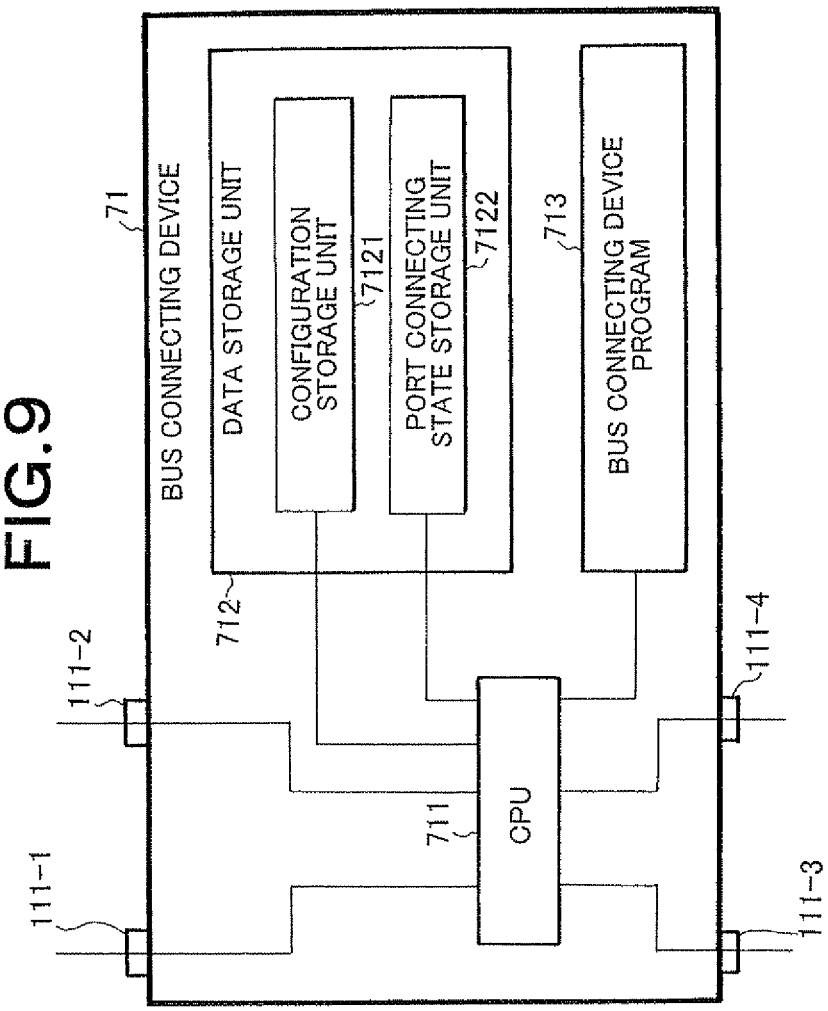
FIG. 9 is a block diagram showing a configuration according to a third embodiment of the present invention.

FIG. 9 is a block diagram showing a configuration of the third embodiment of the present invention.

Referring to FIG. 9, a bus connecting device 71 according to the third embodiment of the present invention includes the connecting ports 111-1 to 111-4, a CPU 711, a data storage unit 712, and a bus connecting device program 713.

The connecting ports 111-1 to 111-4 are units to which the external device is connected. The CPU 711 is a unit that performs data processing. The data storage unit 712 is a unit that stores data.

The bus connecting device program 713 has a function that causes the CPU 711 to perform a process of the bus connecting device 71.

The bus connecting device program 713 is loaded on the CPU 711 and generates data corresponding to the configuration registers 1121-1 to 1121-4 and the bridge state storage unit 115 in the first embodiment in FIG. 3.

The generated data are stored in a configuration storage unit 7121 and a port connecting state storage unit 7122.

The CPU 711 performs the same processes as those in the link connecting bridges 112-1 to 112-4, the data transfer unit 113, and the bridge management unit 114 in the first embodiment under the control of the bus connecting device program 713.

The bus connecting device program 713 is loaded on the CPU 711 generate data corresponding to the configuration registers 1121-1 to 1121-4 in the second embodiment shown in FIG. 6.

The generated data are stored in the configuration storage unit 7121.

The CPU 711 performs the same processes as those in the link connecting bridges 411-1 to 411-4 and the data transfer unit 412 in the second embodiment under the control of the bus connecting device program 713.

FIRST EXAMPLE

A first example of the present invention will be described below with reference to the accompanying drawings. This example corresponds to the first embodiment to carry out the present invention.

Referring to FIG. 10, the example includes a CPU 81, a host bridge 82, I/Os 83-1 to 83-3, and a PCI Express switch 84.

The "I/O" corresponds to an "input/output device" according to the present invention.

The PCI Express switch 84 connect the CPU 81 and the I/Os 83-1 to 83-3 to each other inside a computer.

The CPU 81 is connected to the PCI Express switch 84 through the host bridge 82.

The PCI Express switch 84 includes an upstream port 841 as the connecting port 111-1, downstream ports 842-1 to 842-3 as the connecting ports 111-2 to 111-4, the upstream PCI-PCI bridge 843 as the link connecting bridge 112-1, downstream PCI-PCI bridges 844-1 to 844-3 as the link connecting bridges 112-2 to 112-4, a packet transfer unit 845 as the data transfer unit 113, a bridge management unit 846 as the bridge management unit 114, a bridge state storage unit 847 as the bridge state storage unit 115, PCI configuration registers 8431-1 to 8431-4 as the configuration registers 1121-1 to 1121-4, and host interrupt units 8432-1 to 8432-4 as the host interrupt unit 1122-1 to 1122-4.

In this case, since the upstream PCI-PCI bridge 843 is always connected to the CPU 81, a function corresponding to link-up detection of the bridge management unit 114 is excluded, and it is ensured that data including initial configuration data is always transferred.

First, the following case will be supposed. That is, the CPU 81 is connected to the upstream port 841 through the host bridge 82, the I/Os 83-1 and 83-2 are connected to the downstream ports 842-1 and 842-2, and an external device is not connected to the downstream port 842-3.

When the entire system is powered on, the downstream PCI-PCI bridges 844-1 to 844-3 start link training.

As a result, the downstream PCI-PCI bridges 844-1 and 844-2 to which the external device is connected are linked up, and the downstream PCI-PI bridge 844-3 to which the external device is not connected is linked down.

The bridge state storage unit 847 detects link-up states of the downstream PCI-PCI bridges 844-1 and 844-2 and describes the link-up states in the bridge state storage unit 847.

Upon completion of the above operations, an initial configuration of the PCI Express switch 84 is started by a BIOS of a host operated by the PCI Express switch 84.

In this case, in a standard of measure determined by the PCI-SIG (PCI Special Interest Group), it is ensured that the initial configuration by the BIOS is not started simultaneously with the start of the system but is started a predetermined period of time after the start of the system.

For this reason, the description of information in the bridge state storage unit 847 may be completed within a predetermined period of time designated by the standard of measure.

The initial configuration subsequently started by the BIOS is performed by using an initial configuration packet called a configuration TLP (Transaction Layer Packet).

The packet transfer unit 845 receives the configuration TLP initially configuring the downstream PCI-PCI bridges 844-1 to 844-3 issued by the CPU 81 from the upstream PCI-PCI bridge 843.

It is checked that a destination of the received TLP is registered in the bridge state storage unit 847.

When the destination is registered, the packet transfer unit 845 transfers the TLP to the destination downstream PCI-PCI bridges 844-1 to 844-3.

On the other hand, when the destination is not registered, the TLP is not transferred, and a UR (Unsupported Request) TLP is returned to the CPU 81.

More specifically, the TLP is transferred to the downstream PCI-PCI bridges 844-1 and 844-2, and the TLP is not transferred to the downstream PCI-PCI bridge 843-3.

In the initial configuration, the PCI configuration registers 8431-2 and 8431-3 are loaded by a configuration Read TLP.

Subsequently, on the basis of the loaded device information, information that controls the downstream PCI-PCI bridges 844-1 and 844-2 is written in the PCI configuration registers 8431-2 and 8431-3 by a configuration Write TLP.

This is the end of the initial configuration of the PCI Express switch 84. However, in the configuration, the PCI Express switch 84 performs an initial configuration as a 1:2 switch that connects the CPU 81 and the I/Os 83-1 and 83-2.

It is supposed that the I/O 83-3 is hot-plugged to the downstream port 842-3 during an operation of the host.

The downstream PCI-PCI bridge 844-3 starts link training to be linked up.

The bridge management unit 846 detects a link-up state of the downstream PCI-PCI bridge 844-3 and describes the linked-up downstream PCI-PCI bridge 844-3 in the bridge state storage unit 847.

The host interrupt unit 8432-4 interrupts an OS of the host operated on the CPU 81.

With this interrupt, the OS loads the PCI configuration register 8431-4 of the downstream PCI-PCI bridge 844-3 interrupted by the configuration Read TLP.

Subsequently, on the basis of the loaded device information, information for controlling the downstream PCI-PCI bridge 844-3 is written in the PCI configuration register 8431-4 by the configuration Write TLP.

In this manner, the initial configuration of the hot-plugged downstream PCI-PCI bridge 844-3 is completed.

In this case, the setting of the bridge state storage unit 847 is completed before the downstream PCI-PCI bridge 844-3 sets interrupt.

Therefore, the configuration TLP from the OS is permitted to be transferred to the downstream PCI-PCI bridge 844-3 in the packet transfer unit 845.

SECOND EXAMPLE

A second example of the present invention will be described below with reference to the accompanying drawings. The example corresponds to the second embodiment to carry out the present invention.

Referring to FIG. 11, the example, as in the first example, includes the CPU 81, the host bridge 82, the I/O 83-1 to 83-3, and a PCI Express switch 91.

The PCI Express switch 91 connects the host bridge 82 and the I/O 83-1 to 83-3 to each other inside the computer.

The CPU 81 is connected to the PCI Express switch 91 through the host bridge 82.

The PCI Express switch 91 includes an upstream port 841 as the connecting port 111-1, downstream ports 842-1 to 842-3 as the connecting ports 111-2 to 111-4, an upstream PCI-PCI bridge 911 as the link connecting bridge 411-1, downstream PCI-PCI bridges 912-1 to 912-3 as the link connecting bridges 411-2 to 411-4, a packet transfer unit 913 as the data transfer unit 412, link-up detecting units 9121-1 to 9121-3 as the link-up detecting units 4111-2 to 4111-4, transfer control units 9122-1 to 9122-3 as the transfer control units 4112-2 to 4112-4, PCI configuration registers 8431-1 to 8431-4 as the configuration registers 1121-1 to 1121-4, and host interrupt units 8432-1 to 8432-4 as the host interrupt unit 1122-1 to 1122-4.

As in the first example, since the upstream PCI-PCI bridge 911 is always connected to the CPU 81, functions corresponding to the link-up detecting unit 4111-1 and the transfer control unit 4112-1 are excluded, and it is always ensured that initial configuration data is transferred from the host to PCI configuration registers 8431-1.

As the first example, the following case will be supposed. That is, the CPU 81 is connected to the upstream port 841 through the host bridge 82, the I/Os 83-1 and 83-2 are connected to the downstream ports 842-1 and 842-2, and an external device is not connected to the downstream port 842-43.

When the entire system is powered on, the downstream PCI-PC bridges 844-1 to 844-3 start link training.

As a result, the downstream PCI-PCI bridges 912-1and 912-2 to which the external device is connected are linked up, and the downstream PCI-PCI bridge 912-3 to which the external device is not connected is linked down.

The link-up detecting units 9121-1 and 9121-2 detect link-up states of the downstream PCI-PCI bridges 912-1 and 912-2 and notifies the transfer control units 9122-1 and 9122-2 of the link-up states.

The transfer control units 9122-1 and 9122-2 permit to transfer the initial configuration data from the host to the PCI configuration registers 8431-2 and 8431-3 by the notification.

Upon completion of the above operations, an initial configuration of the PCI Express switch 91 is started by the BIOS of the host operated by the PCI Express switch 84.

The initial configuration is performed by the configuration TLP. In this example, the initial configuration is performed for the downstream PCI-PCI bridges 912-1 and 12-2 In the downstream PCI-PCI bridge 912-3, the configuration TLP does not permit to access the PCI configuration register 8431-4, and an UR TLP is returned to the CPU 81.

In the initial configuration for the downstream PCI-PCI bridges 912-1 and 912-2, the PCI configuration registers 8431-2 and 8431-3 are loaded by a configuration read TLP.

Subsequently, on the basis of the loaded device information, information for controlling the downstream PCI-PCI bridges 912-1 and 912-2 is written in the PCI configuration registers 8431-2 and 8431-3 by the configuration Write TLP.

In this manner, the initial configuration of the PCI Express switch 91 is completed. However, as in the first example, the PCI Express switch 91 performs an initial configuration as a 1:2 switch that connects the CPU 81 and the I/Os 83-1 and 83-2.

It is supposed that the I/O 83-3 is hot-plugged to the downstream port 842-3 during an operation of the host.

The downstream PCI-PCI bridge 912-3 starts link training to be linked up. The link-up detecting unit 9121-3 detects a link-up state of the downstream PCI-PCI bridge 912-3 and notifies the transfer control units 9122-3 of the link-up state.

The transfer control unit permits the host to access the PCI configuration register 8431-4.

The host interrupt unit 8432-4 interrupts an OS of the host operated on the CPU 81.

With this interrupt, the OS loads the PCI configuration register 8431-4 of the downstream PCI-PCI bridge 912-3 interrupted by using the configuration Read TLP.

Subsequently, on the basis of the loaded device information, information for controlling the downstream PCI-PCI bridge 912-3 is written in the PCI configuration register 8431-4 by the configuration Write TLP.

In this manner, the configuration of the hot-plugged downstream PCI-PCI bridge 912-3 is completed.

THIRD EXAMPLE

A third example of the present invention will be described below with reference to the accompanying drawings. The example corresponds to the third embodiment to carry out the present invention.

Referring to FIG. 12, the example, as in the first example, includes the CPU 81, the host bridge 82, the I/O 83-1 to 83-3, and a PCI Express switch 101.

The PCI Express switch 101 connects the CPU 81 and the I/O 83-1 to 83-3 to each other inside the computer.

The CPU 81 is connected to the PCI Express switch 101 through the host bridge 82.

The PCI Express switch 101 includes an upstream port as the connecting port 111-1, downstream ports 842-1 to 842-3 as the connecting ports 111-2 to 111-4, a CPU 1011 as the CPU 711, a data storage unit 1012 as the data storage unit 712, a PCI Express switch program 1013 as the bus connecting device program 713, a PCI configuration storage unit 10121 as the configuration storage unit 7121, and the port connection state storage unit 10122 as the port connecting state storage unit 7122.

The PCI Express switch program (program product) 1013 is loaded on the CPU 1011 and generate data corresponding to the PCI configuration registers 8431-1 to 8431-4 and the bridge state storage unit 847 in the first example shown in FIG. 10.

The generated data are stored in the PCI configuration storage unit 10121 and the port connection state storage unit 10122, respectively.

The CPU 1011 performs the same processes as those in the upstream PCI-PCI bridge 843, the downstream PCI-PCI bridges 844-1 to 844-3, the packet transfer unit 845, and the bridge management unit 846 in the first example under the control of the PCI Express switch program 1013.

The bus connecting device can be realized by hardware, software, or a combination thereof.

In above examples, the system includes a CPU, a PCI Express switch, and three I/O devices. However, the system may include a plurality of CPUs, a PCI Express switch, and a I/O device, or a plurality of CPUs, a PCI Express switch, and a plurality of I/O devices.

The embodiments and the examples achieve the following advantages.

The first advantage is that a bus connecting device that can autonomously shorten an initial configuration time without changing software of a host can be provided.

This is because a bridge connected to an external device is detected before an initial configuration of a host is started, and a setting which defines only the detected bridge as a target of the initial configuration is autonomously performed.

The second advantage is that a bus connecting device that shortens an initial configuration time for which a setting of a hot plug of an external device can be autonomously performed without changing software of a host can be provided.

This is because a bridge to which the external device is hot-plugged is detected during an operation of the system, and a setting of initial configuration data transfer and interrupt to the host are autonomously performed to initially configure the detected bridge.

The third advantage is that a bus connecting device that shortens an initial configuration time which does not require physical hardware such as software or an external pin to set the bus connecting device can be provided.

The reason is the same as those of the first and second advantages.

The fourth advantage is that a bus connecting device that can prevent an erroneous setting or an erroneous operation and shortens an initial configuration time can be provided.

The reason is the same as those of the first and second advantages.

The present invention can be applied to a bus switch that connects internal components of a computer apparatus or a network apparatus to each other.

Although the exemplary embodiments and examples of the present invention have been described in detail, it should be understood that various changes, substitutions and alternatives can be made therein without departing from the spirit and scope of the invention as defined by the appended claims. Further, it is the inventor's intent to retain all equivalents of the claimed invention even if the claims are amended during prosecution.

What is claimed is:

1. A bus connecting device connecting a host with an external device, comprising:
   a bridge for connecting to the external device;
   a detecting unit for detecting the bridge linked up by connection of the external device before an initial configuration from the host is started in an initial configuration state of a system including the host and the external device, the detecting unit detecting the linked-up bridge by training of links subsequent to a power-on of the system or return from a device reset state; and
   a setting unit for setting the bridge which is linked up, as a target for an initial configuration from the host.

2. The bus connecting device according to claim 1, wherein the setting unit comprises a storage unit for storing information of the bridge which is linked up, and a data transfer unit for transferring initial configuration data of the host to the bridge on the information stored by the storage unit.

3. The bus connecting device according to claim 2, wherein the detecting unit detects a bridge linked up by hot-plugging the external device, the external device being hot-plugged to an idle port corresponding to a bridge which is not initially configured by the host during an operation of the host,
   the storage unit stores information of the linked-up bridge by a hot plug, the bus connecting device includes a unit that performs interrupt notification to the host with respect to the bridge detected by the detecting unit,
   the interrupt notification notifying occurrence of a hot plug, and
   the data transfer unit transfers data for initially configuring the linked-up bridge to the linked-up bridge with reference to the information stored in the storage unit, the data being transferred from the host.

4. The bus connecting device according to claim 1, wherein the setting unit comprises a transfer control unit for permitting configuration access to a configuration register to the host, by detecting a link-up state in the detecting unit, the configuration register being a configuration register included in the bridge which is linked up.

5. The bus connecting device according to claim 4, wherein the detecting unit detects a bridge linked up by hot-plugging the external device, the external device being hot-plugged to an idle port corresponding to a bridge which is not initially configured by the host during an operation of the host,
   the transfer control unit permits configuration access to a configuration register to the host, by detecting the link-up state by the detecting unit during the operation of the host, the configuration register being a configuration register included in the bridge which is linked up, and the host starts an initial configuration of the hot-plugged bridge in response to the notification.

6. The bus connecting device according to claim 1, wherein the detecting unit detects a bridge linked up by hot-plugging the external device, the external device being hot-plugged to an idle port corresponding to a bridge which is not initially configured by the host during an operation of the host, the bus connecting device includes a unit that performs interrupt notification to the host with respect to the bridge detected by the detecting unit during an operation of the host, the interrupt notification notifying occurrence of a hot plug, and the host starts an initial configuration of the hot-plugged bridge in response to the notification.

7. The bus connecting device according to claim 1, wherein the external device is an input/output device.

8. The bus connecting device according to claim 1, wherein a standard of a bus connected by the bus connecting device conforms to the PCI Express.

9. The bus connecting device according to claim 1, wherein the bus connecting device configures a PCI Express switch.

10. The bus connecting device according to claim 1, wherein a bridge other than the bridge to which the external device is connected can be defined as a target of an initial configuration.

11. A bus connecting device for connecting a host with an external device, comprising:

a detecting unit for detecting a bridge linked up by hot-plugging the external device, the external device being hot-plugged to an idle port corresponding to a bridge which is not initially configured by the host during an operation of the host; and a unit for performing interrupt notification to the host with respect to the bridge detected by the detecting unit, the interrupt notification notifying occurrence of a hot plug, wherein the host starts an initial configuration of the hot-plugged bridge in response to the notification.

12. The bus connecting device according to claim 11, further, comprising:

a storage unit for storing information of the linked-up bridge; and a data transfer unit for transferring data for initially configuring the linked-up bridge to the linked-up bridge with reference to the information stored in the storage unit, the data being transferred from the host.

13. The bus connecting device according to claim 11, further comprising:

a transfer control unit for permitting configuration access to a configuration register to the host, by detecting the link-up state by the detecting unit, the configuration register being a configuration register included in the bridge which a link up is detected.

14. The bus connecting device according to claim 11, wherein the external device is an input/output device.

15. The bus connecting device according to claim 11, wherein a standard of a bus connected by the bus connecting device conforms to the PCI Express.

16. The bus connecting device according to claim 11, wherein the bus connecting device configures a PCI Express switch.

17. The bus connecting device according to claim 11, wherein a bridge other than the bridge to which the external device is connected can be defined as a target of an initial configuration.

18. A bus connecting method for connecting a host with an external device, comprising:

a step of detecting the bridge linked up by connection of the external device before an initial configuration from the host is started in an initial configuration state of a system including the host and the external device, the step of detecting the linked up bridge being performed by training of links subsequent to a power-on of the system or return from a device reset state; and a step of setting the bridge which is linked up, as a target for an initial configuration from the host.

19. The bus connecting method according to claim 18, wherein the step of setting comprises a step of storing information of the bridge which is linked up, and a step of transferring initial configuration data of the host to the bridge on the information stored by the step of storing.

20. The bus connecting method according to claim 19, wherein the detecting step includes detecting a bridge linked up by hot-plugging the external device, the external device being hot-plugged to an idle port corresponding to a bridge which is not initially configured by the host during an operation of the host, the step of detecting includes storing the information of the linked-up bridge by a hot plug, the step of storing includes performing interrupt notification to the host with respect to the bridge detected by the step of detecting during an operation of the host, the interrupt notification notifying occurrence of a hot plug, and the step of transferring includes transferring data for initially configuring the linked-up bridge to the linked-up bridge with reference to the information stored in the step of storing, the data being transferred from the host.

21. The bus connecting method according to claim 18, wherein the step of setting comprises a step of peimitting configuration access to a configuration register to the host, by detecting a link-up state in the step of detecting, the configuration register being a configuration register included in the bridge which is linked up.

22. The bus connecting method according to claim 21, wherein the detecting step includes detecting a bridge linked up by hot-plugging the external device, the external device being hot-plugged to an idle port corresponding to a bridge which is not initially configured by the host during an operation of the host, the step of permitting includes permitting configuration access to a configuration register to the host, by detecting the link-up state by the step of detecting during the operation of the host, the configuration register being a configuration register included in the bridge which is linked up, and the method comprises the step of starting an initial configuration of the hot-plugged bridge in response to the notification in the host.

23. The bus connecting method according to claim 18, wherein the detecting step includes detecting a bridge linked up by hot-plugging the external device, the external device being hot-plugged to an idle port corresponding to a bridge which is not initially configured by the host during an operation of the host, the method includes a step of performing interrupt notification to the host with respect to the bridge detected by the step of detecting during an operation of the host; and the method comprises the step of starting an initial configuration of the hot-plugged bridge in response to the notification in the host.

24. The bus connecting method according to claim 18, wherein the external device is an input/output device.

25. The bus connecting method according to claim 18, wherein a bridge other than the bridge to which the external device is connected can be defined as a target of an initial configuration.

26. A bus connecting method for connecting a host with an external device, comprising:
- a step of detecting a bridge linked up by hot-plugging the external device, the external device being hot-plugged the external device, the external device being hot-plugged to an idle port corresponding to a bridge which is not initially configured by the host during an operation of the host;
- a step of performing interrupt notification to the host with respect to the bridge detected by the step of detecting; and
- a step of starting an initial configuration of the hot-plugged bridge in response to the notification in the host.

27. The bus connecting method according to claim 26, wherein a step of storing information of the linked-up bridge; and
- a step of transferring data for initially configuring the linked-up bridge to the linked-up bridge with reference to the information stored in the step of storing.

28. The bus connecting method according to claim 26, wherein a step of permitting configuration access to a configuration register to the host, by detecting the link-up state by the step of detecting, the configuration register being a configuration register included in the bridge which a link up is detected.

29. The bus connecting method according to claim 26, wherein the external device is an input/output device.

30. The bus connecting method according to claim 26, wherein a bridge other than the bridge to which the external device is connected can be defined as a target of an initial configuration.

* * * * *